June 6, 1967 H. T. STENHAMMAR 3,324,245

RINGING SIGNAL RESPONSIVE, RECORDING AND CONTROL DEVICE

Filed April 4, 1963 7 Sheets-Sheet 1

INVENTOR.
HAROLD T. STENHAMMAR

BY [signature]
ATTORNEY

June 6, 1967 H. T. STENHAMMAR 3,324,245

RINGING SIGNAL RESPONSIVE, RECORDING AND CONTROL DEVICE

Filed April 4, 1963 7 Sheets-Sheet 2

INVENTOR
HAROLD T. STENHAMMAR
BY
ATTORNEY

RINGING SIGNAL RESPONSIVE, RECORDING AND CONTROL DEVICE

Filed April 4, 1963 7 Sheets-Sheet 3

INVENTOR
HAROLD T. STENHAMMAR
BY
ATTORNEY

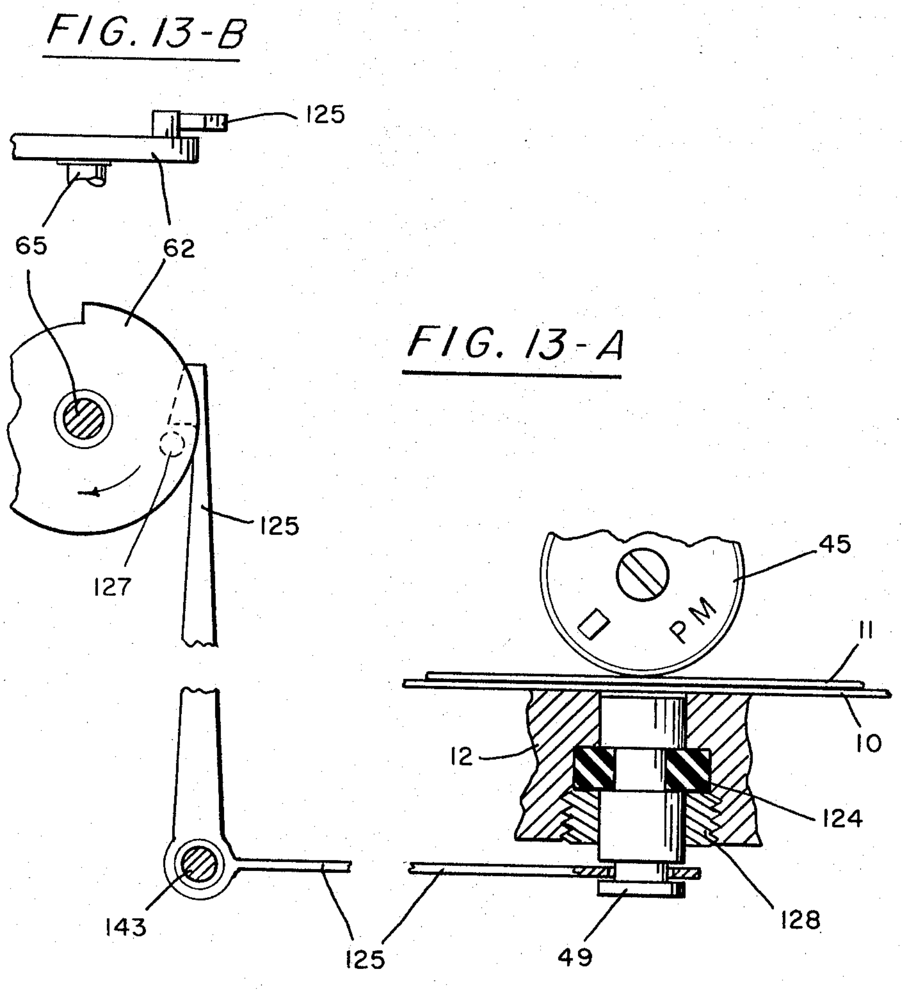
FIG. 13-B, FIG. 13-A
INVENTOR.
HAROLD T. STENHAMMAR
BY
ATTORNEY

RINGING SIGNAL RESPONSIVE, RECORDING AND CONTROL DEVICE

Filed April 4, 1963

7 Sheets-Sheet 5

INVENTOR
HAROLD T. STENHAMMAR
BY
ATTORNEY

INVENTOR
HAROLD T. STENHAMMAR
BY
ATTORNEY

INVENTOR
HAROLD T. STENHAMMAR
BY
ATTORNEY

United States Patent Office 3,324,245

Patented June 6, 1967

3,324,245

RINGING SIGNAL RESPONSIVE, RECORDING AND CONTROL DEVICE

Harold T. Stenhammar, 55 E. 93rd St., New York, N.Y. 10028

Filed Apr. 4, 1963, Ser. No. 270,732

9 Claims. (Cl. 179—2)

This invention relates to an apparatus which is responsive to acoustically or inductively generated electrical signals. It incorporates responsive means for visually and permanently recording such signals and for remotely controlling the action of other equipment connected to the system.

The apparatus is particularly adapted to be used in conjunction with established communication systems, and especially with standard telephone service. The apparatus is designed to function without direct connection to any part of the system with which it is associated. The apparatus will be described in association with conventional telephone service, although not so limited.

The principal object of the present invention is to provide means, when calling a person by telephone and when there is no answer, for leaving a written message showing from whom the call originated.

Another specific object of the invention is to provide an apparatus enabling the owner of a telephone to know not only who had telephoned in his absence, but also at what time such call was made.

Another important object of the invention is to provide an apparatus which is responsive to orders originating from different remotely located points for the control of other equipment connected to the system.

It is a further object of the invention to provide timing apparatus which may be preset as to the length of its individual timing cycles and which is initiated with respect to the starting of such timing cycles by signals received from remote points.

Another object of the invention is to provide selective means for either manual or remote control of an elapsed time unit which, in turn, is capable of controlling the operation of equipment connected thereto.

A further object of the invention is to incorporate means for quickly identifying the proper number for calling other subscribers.

Still another object of the invention is to provide a permanent record of telephone calls.

These and other objects and advantages of the invention will become apparent from a study of the following specification and the drawings which are attached hereto and made a part of this application. In these drawings, like reference numerals indicate like parts, and:

Figures 5, 6, 7, 8, 9:
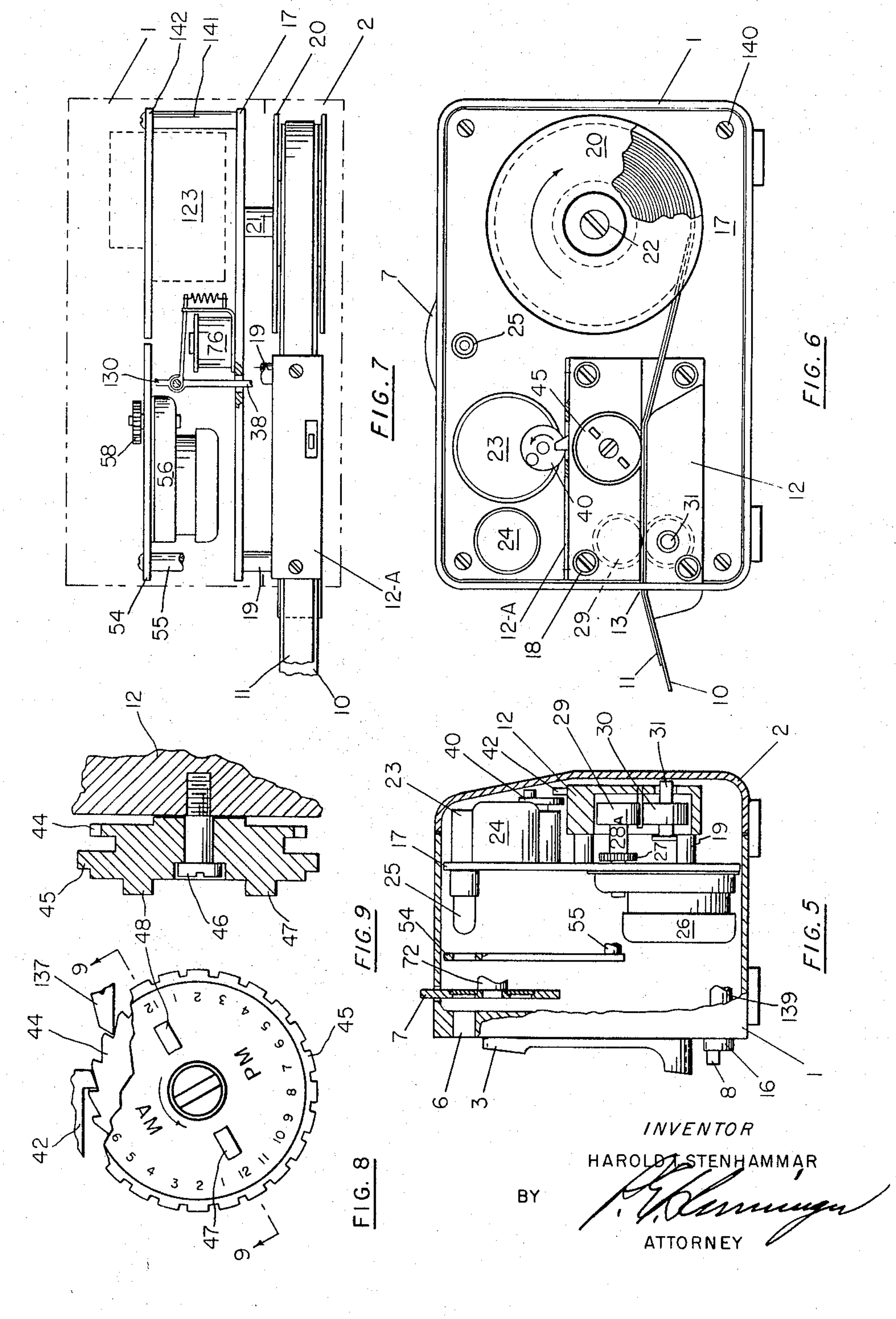
FIG. 5 is a partial, cross-sectional view as seen from the right in FIG. 1.
FIG. 6 is a rear elevation of the signal receiver, the back cover having been removed.
FIG. 7 is a plan view of the signal receiver with the outer housing removed to show parts of the internal mechanism.
FIG. 8 is an enlarged fragmentary detail view of FIG. 6.
FIG. 9 is a cross-sectional view on line 9—9 of FIG. 8.
Figures 10, 11, 12, 13, 14, 15, 16:
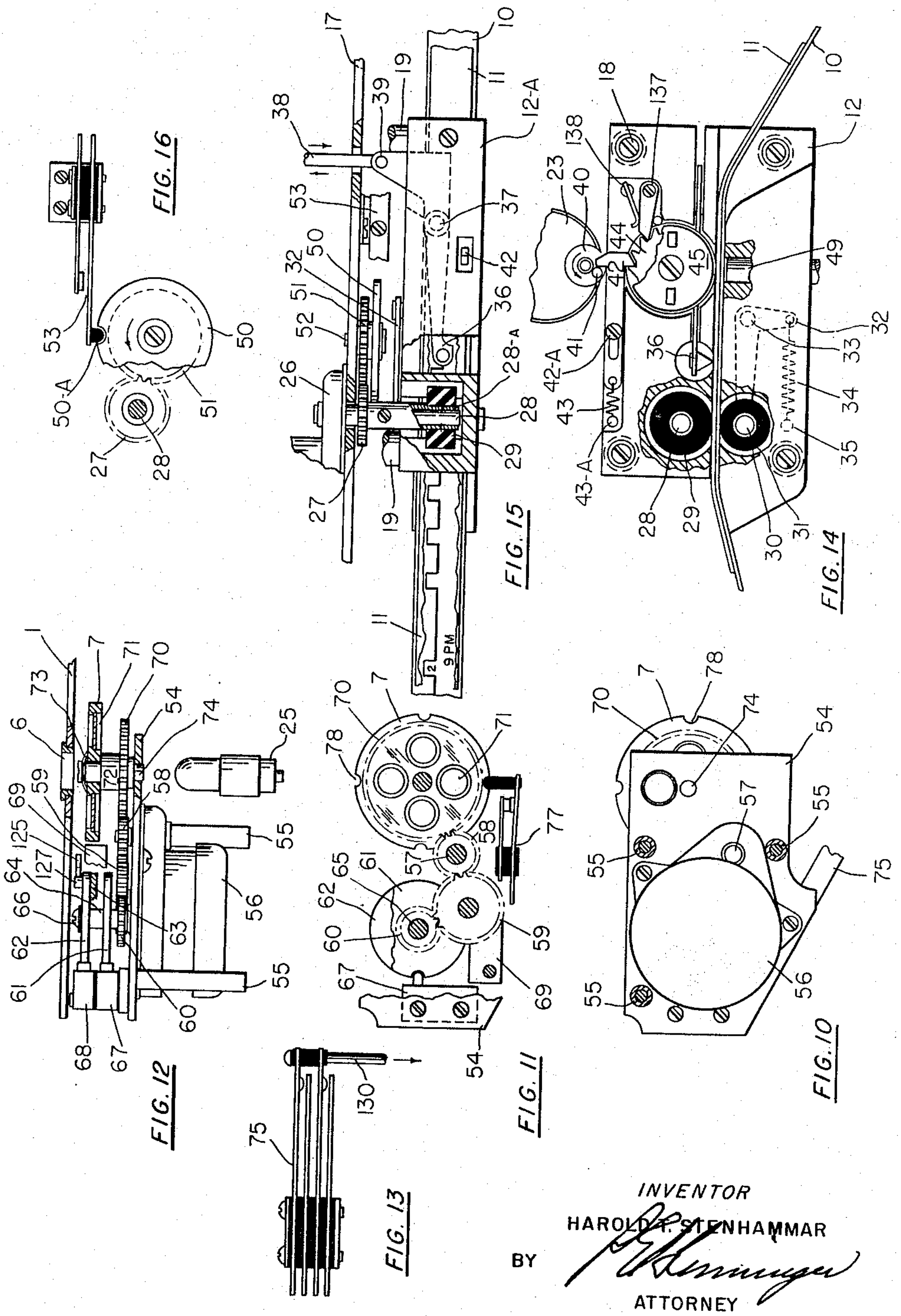
FIG. 10 is a rear view of parts of the mechanism of FIG. 7.
FIG. 11 is a view similar to FIG. 10 with overlying parts removed to more clearly show underlying structure.
FIG. 12 is a plan view of FIG. 10.
FIG. 13 is an enlarged detail of elements of FIG. 10.
Figures 17, 18, 19:
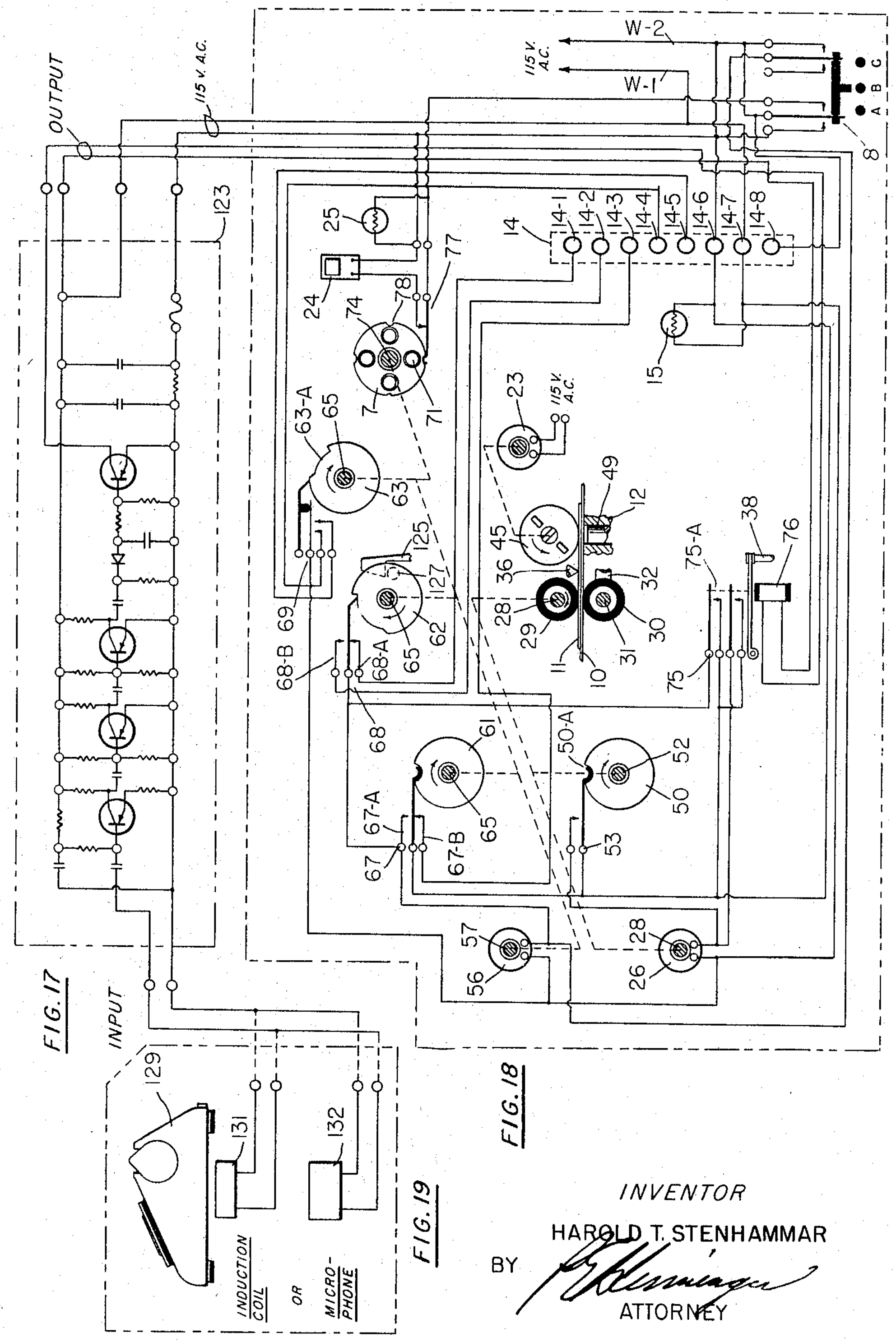
Figures 21, 23, 24:
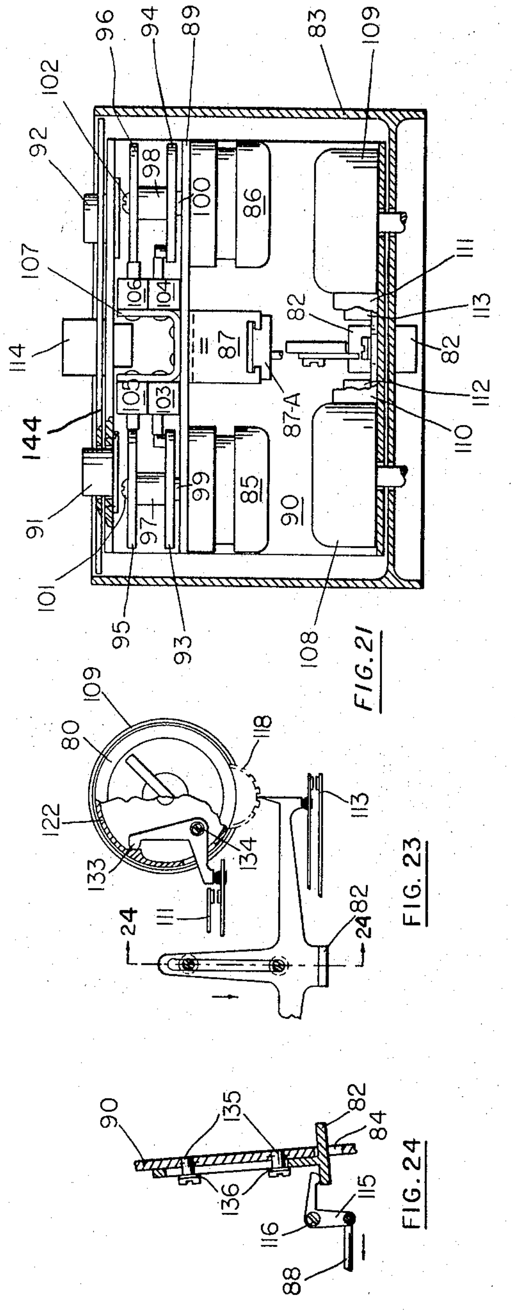
Figures 20, 22:
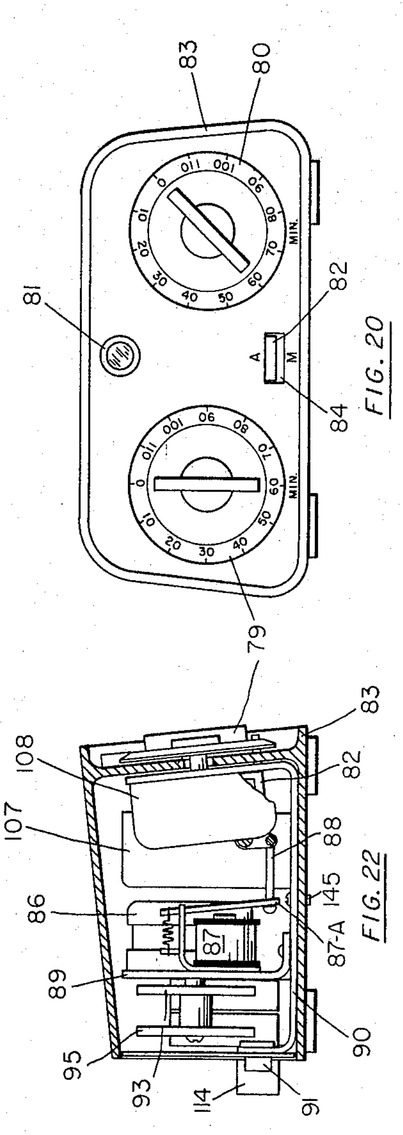

FIG. 13–A is a fragmentary view of details of FIG. 14;

FIG. 13–B is a fragmentary plan view of FIG. 13–A;

FIG. 14 is an enlarged detail view of FIG. 6 with parts broken away to more clearly show the structure of the message tape unit;

FIG. 15 is a partial view of FIG. 14;

FIG. 16 is a detail front view of FIG. 15;

FIG. 17 is a schematic diagram of an amplifier circuit;

FIG. 18 is a schematic diagram of the signal receiver;

FIG. 19 diagrammatically indicates different input means to the signal receiver when employing the invention in conjunction with telephone service;

FIG. 20 is a front elevational view of an exemplary auxiliary timing unit;

FIG. 21 is a plan view of FIG. 20 with the top of the housing and the front part of the chassis broken away to show the underlying mechanism;

FIG. 22 is an elevational view of the timing unit of FIG. 20 taken from the left of FIG. 20 and with the cover broken away to show some of the timer components;

FIG. 23 is a fragmentary detail front view of parts contained in the timing unit of FIG. 21;

FIG. 24 is a cross-sectional view taken on line 24—24 of FIG. 23; and

Figure 25:
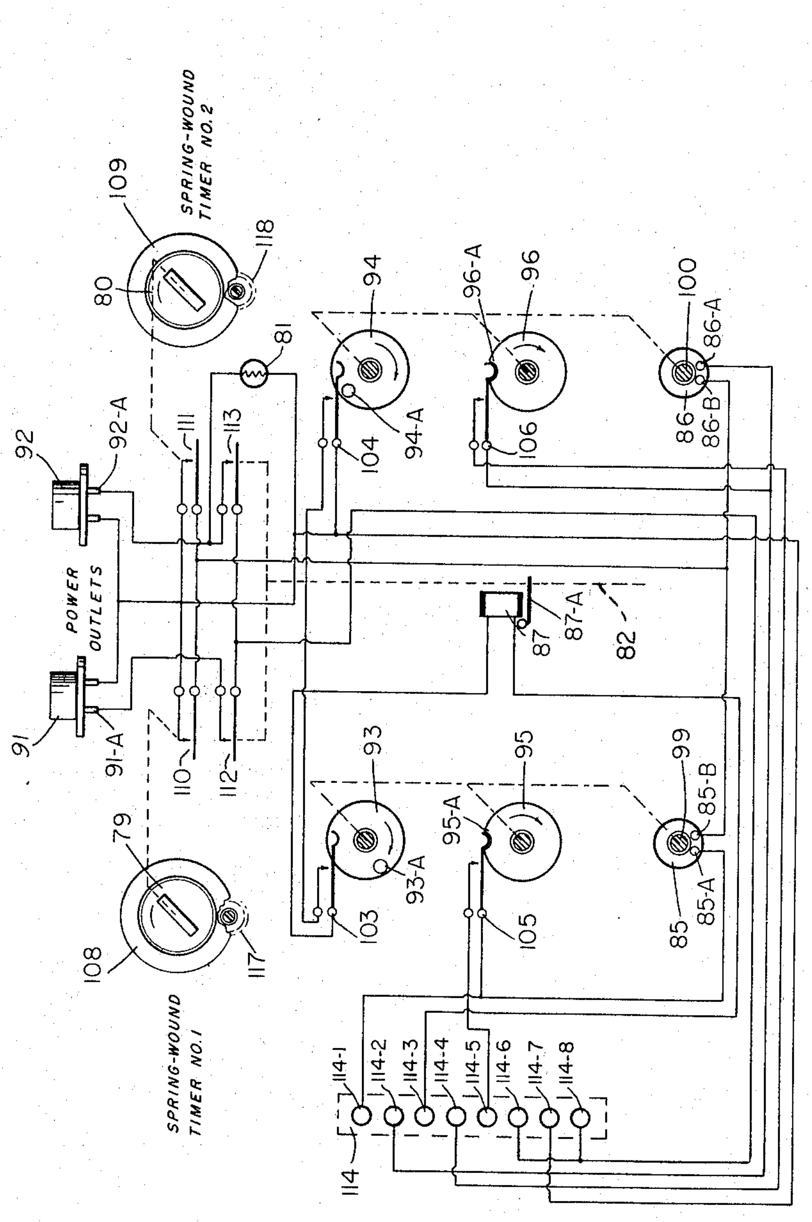

FIG. 25 is a schematic diagram of the timing unit shown in FIGS. 20–22.

A full understanding of the present invention in all of its details will be facilitated by a general functional description of the general nature and function of the signal receiver, the elapsed time indicator and the remotely controlled auxiliary timer. In this description, it will be assumed that the apparatus of the present invention is being employed in conjunction with a standard telephone service, that the signal receiver has been turned on to receive and record messages and that no one is present to answer the telephone.

*The signal receiver—FIGS. 1–4*

Figures 1, 2, 3, 4:
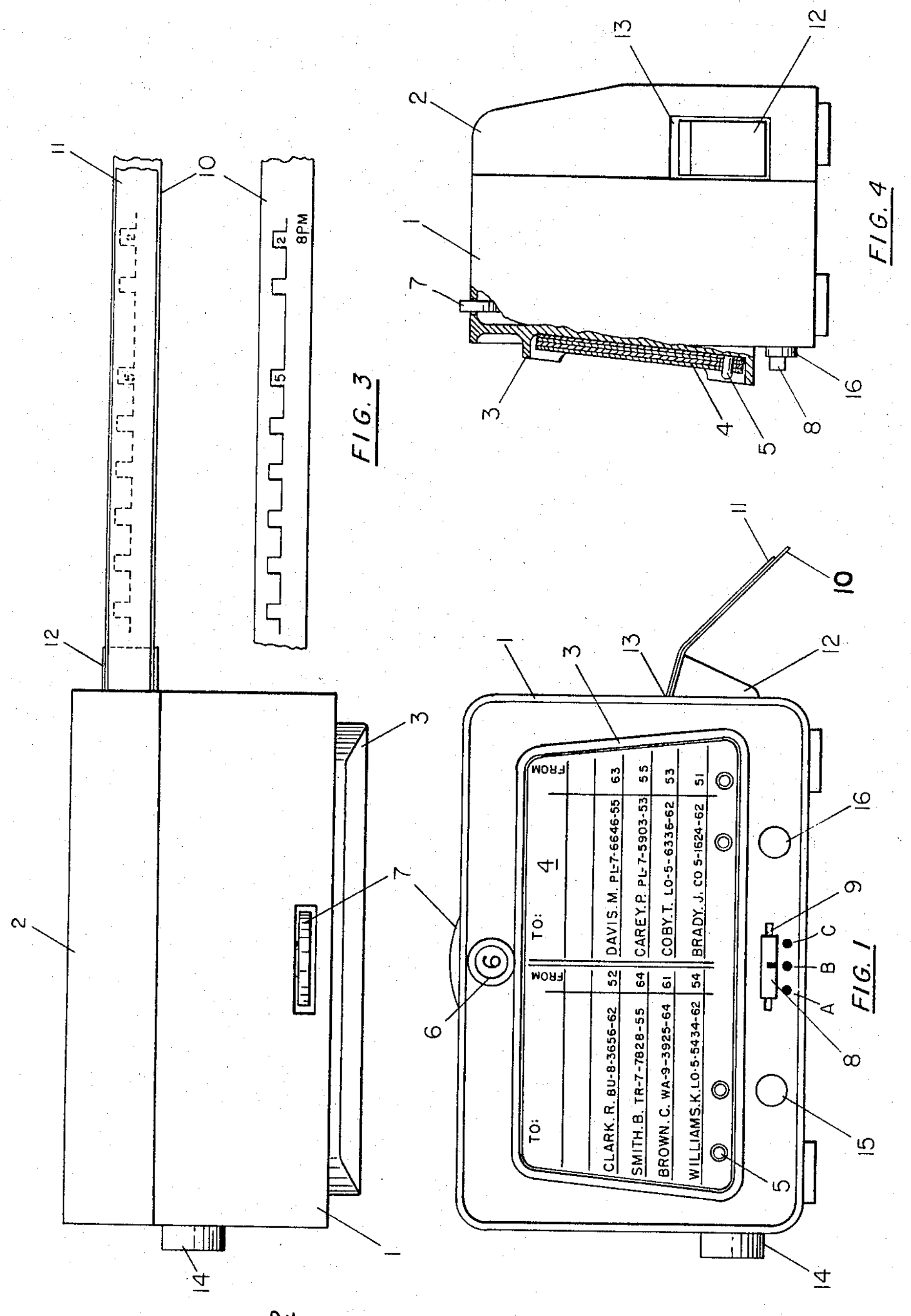
FIG. 1 is a front elevational view of an exemplary signal receiver.
FIG. 2 is a plan view of the receiver of FIG. 1.
FIG. 3 is a specimen of a record tape showing a recorded message thereon.
FIG. 4 is an elevational view from the right of FIG. 1 with the outer housing partially broken away to show underlying structure.

By reference to FIG. 3, which shows a specimen of a paper tape on which a message has been written, it can be seen that a message was received at 8:00 P.M. and that it consisted of the characters 5 and 2. By reference to the code number 52 on the telephone number reference card, shown at the face of FIG. 1, it can be ascertained that the call was from R. Clark to whom the identifying code number 52 previously had been assigned. The first digit of the record is made by Mr. Clark by permitting the telephone to ring five times. If the call is not answered after the fifth ring, and if Mr. Clark wishes to leave his code number 52, he merely hangs up the receiver and then follows up with a call of two rings to record the second digit of his code number. The time, in this example, 8:00 P.M. is printed on the message tape after the last ringing signal of the second digit has been recorded. Successive time notations on the tape thus serve to bracket two sets of numbers which identify the calling party and effectively segregate such calls from other calls.

*The auxiliary timer—FIGS. 20–22*

The auxiliary timer may be used in several ways. For example, it may be used as a standard timer, which after setting it for a given time cycle, produces an audible signal at the end of that cycle. The timer may also be utilized for the purpose of measuring the time cycle of electrical utensils, appliances and apparatus connected to it to turn off such connected devices automatically. A third specific way of employing the auxiliary timer feature of the system is as follows: Should it be desirable during one's absence to bake, cook, record a radio program on a tape recorder, turn on heating or air conditioning systems or to perform other such functions, the auxiliary timer may be set manually to the desired time cycle or cycles whereafter it can be made to initiate these various functions merely by dialing an assigned code number from a remote point.

*The elapsed time indicator—FIGS. 1 and 11*

The elapsed time indicator is an integral part of the signal receiver. In making telephone calls, especially long distance calls, it is useful to be warned of the approach of a new time unit, generally a three minute period for which the subscriber is charged in full even if the time is not completely used. It is, therefore, one of the features of the present invention to show elapsed time, in this instance, in intervals of three minutes. In addition to the visual indication of the passage of such time intervals, a buzzer is provided to produce an audible signal just prior to each time-charge unit.

*Detailed description*

The external feautres of the signal receiver proper are shown in FIGS. 1, 2 and 4. The mechanism of the signal receiver is located within a housing 1 which has a rear cover 2. Fixed to the face of the housing 1 is a card receiver 3 which is adapted to support reference cards 4 which are loosely positioned inside the holder 3 on supporting pins 5. At the upper portion of the housing 1 is a time interval window 6 and a settable elapsed time indicator 7. A switch 8 transversely movable through an opening 9 is located at the lower portion of the housing 1. This switch serves to set the system for the particular service desired. Thus, if the switch is in position A, the system is conditioned for receiving messages or orders for the signal receiver. The switch in position C conditions the system for the timing of telephone calls, and position B is the off position. A message tape 10 with a superimposed carbon tape 11 and a scribe unit 12 may be seen protruding through a gate 13 at the right side of FIG. 1 and also in FIG. 2. A power receptacle 14 at the left side of the casing serves to connect input leads and for other electrical connections to be described later herein. A pair of signal lamps 15 and 16 are located near the bottom of the front panel. A scribe unit has been adopted as the instrument to illustrate the call recording function. It is the objective of the invention to produce a permanent, visual record of the caller's code number. Therefore, the record may be made by any suitable recording device capable of manifesting the code of the caller, not only by means of a square wave, as herein, but also by way of inscribed or printed numbers, or punched holes representative of the several code digits to be recorded.

The location of the scribe unit 12 within the housing can be seen in FIG. 6. The scribe unit 12 with its cover 12–A is mounted on a panel 17 by means of screws 18 and studs 19 (FIG. 7). The power receptacle 14 is fixed to the housing 1. A tape reel 20 is retained within the housing on a stud 21 (FIG. 7) by means of a screw 22 (FIG. 6). A synchronous motor 23 (FIG. 6), a buzzer 24, and an indicator lamp 25 are also mounted on the panel 17 as shown in FIG. 6. A tape drive motor 26 (FIG. 5) has a gear 27 which is fixed to a sleeve 28–A which, in turn, is fixed on a shaft 28. A rubber roller 29 is fixed to the outer end of the sleeve 28–A and rotates in a clockwise direction thus driving the tapes 10 and 11 from right to left, as seen in FIGS. 14 and 15.

The details of the scribe unit 12 may be seen in FIGS. 8, 9, 14, 15 and 16. In FIG. 14, a pressure roller 30 is rotatably mounted on a stud 31 which is fixed at its inner end to a lever 32. The lever 32 is pivoted on the scribe unit 12 by means of a bearing stud 33, and it is held tensioned in a clockwise direction by a spring 34, one end of which is fixed to the lower arm of the lever 32 and the other end of which is fixed to the scribe unit 12 by means of a stud 35.

A scribe 36, shown in FIGS. 14 and 15, is pivoted on a pivot stud 37 and it is rotatable on said stud in a horizontal plane by a relay coupling rod 38 hinged to the scribe 36 at point 39. The scribe 36 has a downwardly extending point which, because of tension on the scribe, exerts pressure against the carbon tape 11 which is positioned on top of the message tape 10.

A 1 r.p.h. synchronous motor disk 40 (FIG. 14), driven in a counterclockwise direction by the motor 23, is provided with a pin 41. When the pin 41 engages a ratchet pawl 42, the pawl drives a ratchet wheel 44 in a counterclockwise direction. The pawl 42 is biased to the left in FIG. 14 by a spring 43 which has one of its ends attached to the pawl and its other end attached to a spring anchor 43–A. The ratchet 44 is part of a time stamp wheel 45 (FIGS. 8 and 9) and it is mounted for rotation on a bearing stud 46 extending from the scribe unit 12. The ratchet 44 is provided with forty-eight teeth and, therefore, advances itself and the stamp wheel 45, of which it is a part, into forty-eight different positions per revolution. The first 180° of the peripheral surface of the stamp wheel 45 is provided with printing numerals for every hour of the day and each numeral in this part of the wheel is followed by the letters AM. The second 180° of the stamp wheel is similarly arranged with the sole difference that the letters PM follow the numerals. The time stamp wheel 45 is rotatable through two protrusions 47 and 48. It is understood that neither the disk 40, the ratchet 44, nor the printing wheel 45 are limited to a once per hour operation but may, for example, be driven through a complete revolution every one-half hour or even during shorter time intervals, if desired. A stop pawl 137 (FIG. 14) with a spring 138 prevent the wheel 45 from moving in a clockwise direction.

The actual impression of the time of the incoming call is made on the tape by a plunger 49 (FIG. 14) as will be described later.

Shown in FIGS. 15 and 16 is a cam 50 which is fixed to a gear 51 rotatably mounted on a stud 52. The motor 26 through its gear 27 drives the gear 51 and the cam 50, thus operating a normally open switch 53.

FIGS. 10–13 show the elapsed time unit which includes a mounting bracket 54 to which are fixed three mounting studs 55. The mounting bracket 54 has fixed thereto a synchronous motor 56 whose shaft 57 has fixed thereto a gear 58 which drives an idler gear 59 coupled to a gear 60. The gear 60, together with two cams 61 and 62 and a cam segment 63 are fixed on a hub 64 and are held on a bearing stud 65 by a screw 66. The cams 61, 62 and 63 thus rotatably mounted on the stud 65, operate switches 67, 68 and 69, respectively, as shown more clearly in FIG. 18. A stud 127 on the cam 62 operates a plunger arm 125 as shown in FIGS. 13–A and 13–B.

The gear 58 also drives a gear 70 which is made of clear plastic to permit the light beam from the indicator lamp 25 to pass through the numbered windows 71 in the elapsed time indicator disk 7. The gear 70 is fixed to a hub 72 but the indicator 7 is only frictionally coupled to the hub 72 by means of a friction washer 73 (FIG. 12). Therefore, the indicator 7 is free to rotate while setting it on its bearing stud 74 which is fixed to the mounting bracket 54.

In FIGS. 10 and 13 are shown two pairs of normally open contacts 75 which are also mounted on the bracket 54 and are operable by a relay 76 (FIG. 7) by means of the coupling rod 38 (FIG. 15). The contact pair 77 is operated by notches 78 in the indicator 7, and thus momentarily close the circuit to the buzzer 24 approximately ten seconds prior to the beginning of every three minute time interval when the numerals 3, 6, 9 or 12 in the window 71 of the indicator 7 become visible through the window 6 of the housing 1. If desired, the window 71 may be fitted with translucent plastic of different colors, either in addition to the numbers thereon or in lieu thereof.

FIGS. 20–24 show the auxiliary timer, whose function, as stated, is to start time cycles on command from a remote point or, locally by manual operation, for the control of one or more secondary units for cooking, baking, heating, air conditioning and the like, as previously explained.

Control dials 79 and 80 in FIG. 20 are adapted to program two individual time cycles, later to be remotely initiated. A pilot light 81 indicates that the timer or timers are set on A for automatic operation by the switch 82. A housing 83 encloses the whole unit. The control dials 79 and 80 are calibrated in minutes. FIG. 21 shows the arrangement of the interval parts wherein 85 and 86 are two standard electrical gear motors. A relay 87 with an armature 87–A and a coupling rod 88 (FIG. 22) is fixed to a mounting bracket 89 which, in turn, is fastened to a chassis 90 on which are mounted also two power outlets 91 and 92.

Two sets of cams 93, 95 and 94, 96 are fixed to hubs 97 and 98, respectively. These hubs are fastened, respectively, to motor shafts 99 and 100. The two motors 85 and 86 are fastened to the mounting bracket 89 and drive the cam pairs 93, 95 and 94, 96, respectively, thus operating, in a predetermined way, a set of switches 103, 104, 105 and 106, all of which are mounted on a bracket 107 which is also fixed to the bracket 98. The control dials 79 and 80 are connected, respectively, to a pair of standard clock-type timers 108 and 109. The cam 95 is rotatably settable in respect to the cam 93, and the cam 96 is rotatably settable in respect to the cam 94. The cams 95 and 96 are otherwise, respectively, secured to the hubs 97 and 98 by means of set screws 101 and 102. As shown, a pair of switches 112 and 113 (FIGS. 21 and 25) are operable by the relay armature 87–A, and a pair of switches 110 and 111 are operable by the two timers 108 and 109, respectively.

The power outlets 91 and 92 are for the purpose of connecting utensils and appliances and the like which are to be controlled by the auxiliary timer as will be described later herein. A rear cover plate 144 is fastened to the chassis 90 which, in turn, is fixed to the cover 83 by means of a screw 145. A cable (not shown) between the two terminal blocks 14 (FIG. 18) and 114 (FIG. 25) connects the signal receiver with the auxiliary timer.

*Sequence of operation*

The message writing operation can be described with particular reference to FIGS. 17, 18, 19 and 25. Let it be assumed that Clark tried to telephone Williams at 8:00 o'clock in the evening, but after five rings, received no answer. Clark, wishing to leave a message that he was the person calling Williams at 8:00 o'clock, hangs up his receiver and then dials Williams' number again, letting the telephone ring just twice before he replaces the receiver on its hook. Williams, having left his home at 7:30 p.m., half an hour before Clark's call, had turned the switch 8 to A (which is the message receiving position) before leaving. The ringing signals from the telephone instrument 129 are picked up either by an induction coil 131 (FIG. 19) or by a microphone 132 and these signals are amplified by a conventional amplifier 123. The amplified signal energizes the relay 76 causing its contacts to close. Voltage is thereby applied from a terminal 14–6 to the motor 26, which, by means of its rubber roller 29, drives the message tape 10 together with the carbon tape 11 under the writing point of the scribe 36.

At the same time, the relay 76, through its coupling rod 38, moves the scribe 36 in a clockwise direction around its pivot 37, as shown in FIGS. 14 and 15. The writing point of the scribe 36 exerts a slight downward pressure through the carbon tape 11 against the message tape 10 to inscribe a square wave configuration on the message tape 10 for each ringing signal emitted from the telephone instrument 129.

Although the relay 76 becomes deenergized after two seconds—the time required for one ringing signal—the cam 50 will advance in a clockwise direction sufficiently during the first signal to close its contact 53. Closure of the contact 53 will keep the motor 26 energized to continue the advance of the tapes 10 and 11 through the gate 13 in the housing 1. The cam 50 will make a complete revolution in forty-four seconds at which time the contacts 53 open automatically because of the notch 50–A in the cam, thus stopping the motor 26 and the tapes 10 and 11.

If, as in the above example, five ringing signals are used to comprise the first digit of the coded message, and if each signal plus one pause between signals represents six seconds, it follows that twenty-six of the forty-four seconds are used in writing the first group of characters on the tape. The remaining eighteen seconds will be represented by a straight line on the message tape 10, this being the spacing between the first set of rings and those in the second set which is to follow. Clark's second call now merely causes the signal receiver to repeat the procedure above described, this time adding only two signals after which Clark returns the receiver to its hook.

The cams 61, 62 and 63 (FIG. 18) start to rotate at the same time that cam 50 is set into rotation, these cams being driven by the motor 56 as a result of the momentary closing of the contact 75–A. This contact also controls the flow of power to the motor 56 from the terminal 14–6. Before the relay 76 again becomes deenergized at the end of the first ringing signal, the cam 61 will have closed contacts 67–A on the switch 67, thus connecting the terminal 14–6 with the motor 56. Both motors 26 and 56 have their second terminal permanently connected to the other side of the power line.

The three cams 61, 62 and 63 require two and one-half minutes to complete one revolution at which time the motor 56 stops because of the now open contact 67–A. This time cycle allows Clark sufficient time to put through the second digit of his name code, i.e., number 2.

Just before the end of the two and one-half minute cycle, when the cam 62, which is also fixed to the shaft 65, has almost returned to its original position, the arm 125 (FIG. 13–A), pivoted by the hub 143, is moved under tension in a clockwise direction by stud 127 on the cam 62. The lower end of the arm 125 is pivotally coupled to the lower end of the plunger 49 which is slidably mounted in the scribe unit 12. The plunger 49 passes through and is held in a flexible member 124 which is positioned as to permit the plunger 49 to move to a limited extent in a vertical direction. When not under operating impulse, the plunger will drop back to its normal position where it is free of contact with the message tape 10. Therefore, when the arm 125 is rotated in a counterclockwise direction under the influence of the cam 62, as just described, the plunger 49 moves first in a downward direction, then as the upper end of the arm 125 leaves the stud 127, the plunger 49, because of the built up tension in the member 124, is momentarily projected upwardly thus striking the message tape 10 with the carbon tape 11 against the printing face of the time stamp wheel 45. This action imprints "8:00 P.M." on the tape 10. A threaded ring 128 retains the plunger 49 and the member 124 in their upper position in the scribe unit 12.

It should be noted that, because of the relatively short time interval of the two and one-half minutes minus the twenty-six seconds taken to write the first group of digits, this reduces to a bare minimum the chance of another person calling Williams during the interval required by Clark to add the digit 2 to his message.

The operation of the auxiliary timer can be described and understood by particular reference to FIGS. 20–24 and to the schematic diagram of FIG. 25. Let it be assumed that Mrs. Clark has connected two electrical appliances, one to the power outlet 91 and the other to the power outlet 92 of the auxiliary timer, and that she leaves her home at 3:00 o'clock in the afternoon without certainty as to the time of her return.

However, it is her desire that food in the electrical appliances be freshly cooked and ready to serve when she does return. At 5:00 p.m. and away from her home, Mrs. Clark is now certain that she will be home within an hour. Since the food in the appliances requires an hour for proper cooking, Mrs. Clark now telephones her home number and the message receiver and auxiliary timer receive a signal to start the two appliances by switching on the power. The message receiver and the auxiliary timer respond as follows:

Assume that the code digits for starting the auxiliary timer are 42 and that its switch 82 has been set to A (automatic). Also assume that the switch 8 on the message receiver is in position A (message). The switch 82 (FIG. 24) is slidably mounted for movement in a vertical direction on the forward part of the housing 90. Screws 135 fixed to the housing 90 and frictional washers 136 maintain the switch 82 in its operated position. As in the case of the message writing operation described above, the relay 76 (FIG. 18) responds to the incoming two sets of signals. During the first 45° rotation of the cam 62, the voltage from the terminal 14–6 passes through contact 75–A of the relay 76, through the contacts 68–A of the switch 68 to the terminal 14–1 of the terminal block 14, through the terminal 114–1 (FIG. 25) of the terminal block 114 and to the motor 85. As the motor 85 is energized, the cams 93 and 95 rotate in a clockwise direction. The cam 95 is fixed to the shaft 99 but the cam 93 is rotatably settable relative to the cam 95. An insulated stud 93–A will cause the contact 103 to close at the end of the fourth signal, the time required for the stud 93–A to be rotated from the position shown until it closes the switch 103.

The switches 105 and 106 open when the cams 95 and 96 are in their respective home positions because of the two notches 95–A and 96–A. In this description, it is assumed that the timers 108 and 109 have both been set for a given elapsed-time cycle. The contact 111 is, therefore, closed by a member 133 (but shown open in FIG. 23) in the timer 109 since, when rotating the control dial 80, the member 133 rotates approximately 30° clockwise on a stud 134, thus closing the switch 111. In turning the control dial 79 on the timer 108, a member 133–A, similar to member 133, closes the switch 110.

As will be seen, the setting of the switch 82 to the A or automatic position, opens the switches 112 and 113. Since the cam 62 (FIG. 18) during the four ring signal advances past its 45° notched section, the two signals to follow are routed over contacts 68–B of the switch 68, through terminals 14–2 and 114–2, and to the motor 86 which is thus energized to rotate the cams 94 and 96 through two steps. As in the case of the cam 95 and its contact 105, the cam 96 closes the contacts 106 after the first signal and the cam 94 closes the contact 104, in this instance, after the second signal.

The two contacts 103 and 104 now being closed and in series, connect one side of the relay 87 to the power terminal 114–7 which is also connected to one side of the two power outlets 91 and 92. As the cam 61 (FIG. 18) is driven back to its original position by the motor 56, the contact 67–A closes and thus connects the other side of the relay 87 to the power terminal 14–3. This causes the relay 87 to be energized. When the relay 87 pulls in its coupling rod 88 (FIG. 24) which is pivotally fastened to the relay armature 87–A, it rotates in a counterclockwise direction a member 115 which is pivoted on a stud 116, thereby moving the switch 82 in a downward direction. This releases escapement wheels 117 and 118 on the timers 108 and 109, respectively, and at the same time, the switches 112 and 113 are closed. The switches 110 and 111 were closed during the winding and setting of the timers 108 and 109, and, therefore, the power circuit to the outlets 91 and 92 is completed from the terminal 114–6.

Although the relay 87 is soon deenergized again, the friction washers 136 keep the switch 82 in its depressed position and the two switches 112 and 113 remain closed. The contacts 110 and 111 will remain closed until the end of the timing cycle, at which time the member 133 is released by the standard time mechanism in the timer 109, and the upper arm of member 133 strikes a bell 122 (FIG. 23) at the time the lower arm of member 133 opens the switch 111. The same action takes place in the timer 108. Thus the power from the terminal 114–6 to the terminals 91–A and 92–A of the power outlets 91 and 92 is switched off. It will be seen that only if at least one of the timer dials 79 and 80 has been turned from its zero position, will terminals 85–B and 86–B of the motors 85 and 86, be connected to the power terminal 114–7.

The two motors 85 and 86 will go back to their original positions soon after the incoming signal has thus been executed. This is accomplished through the following circuit: closed contacts 105 and 106 connect the terminal 85–A of the motor 85 and the terminal 86–A of the motor 86 to their respective terminals 114–5 and 114–4 of the terminal block 114 over contacts 95–A and 96–A, respectively.

By reference to FIG. 18, it can be seen that the cam 63 which is driven by the motor 56, as previously described, has a notched segment 63–A in the first quarter of its periphery. This will cause the switch 69 to close and thus close a circuit from the power terminal 14–7, over terminals 14–4, 114–4, and over the new closed contacts 106 to the motor terminals 86–A. In like manner, the switch 69 connects the motor terminal 85–A to the power terminal 14–7 over terminals 14–5, 114–5 and to the switch 105. The two motors 85 and 86 are thus made to rotate until the cam notches 95–A and 96–A open the switches 105 and 106, respectively, stopping the cams at their original positions.

Provided the switch 82 has been set to position A (automatic) and the switch 8 in the message receiver has been also set to A (message), the two motors 85 and 86 will rotate their respective cams in accordance with a specific coded signal received from a remote point and will turn on power to energize the power outlets 91 and 92. During the time period the timers 108 and 109, or either of them, have been set to receive a command, and prior to the issuance of such command, the motors 85 and 86 will react to other ringing signals. As evidenced from the foregoing, however, the relay 87 will not be energized nor will the power to the outlets 91 and 92 be turned on unless the proper code signal for these functions has been received. Also, the cams 93 and 96 and 94 and 95 will always return to their home position as above described.

For the manual operation of the auxiliary timer, the switch 8 on the message receiver must be in position B (off). The W2 wire of the 115-volt power line is now connected to the auxiliary timer over the terminal 14–8. The switch 82 is set to position "M" (manual). Depression of the switch 82 will release escape wheels 117 and 118; also contacts 112 and 113, or either of them, are now closed. Therefore, either one or both of the timers 108 and 109 will start their time cycle and deliver power to the respective outlets 91 and 92 as soon as the timers are wound and set to the desired time cycle. At the end of the cycle, the power to the outlets 91 and 92 is cut off, as previously described.

The elapsed time indicator is intended, as stated, for the timing of telephone conversations. The switch 8 on the message receiver is set to position C for this purpose. This setting of the switch connects wire W2 directly from the 115-volt power line to the motor 56 which then drives the time indicator 7. Setting of the switch 8 to position C also connects the wire W2 to the buzzer 24 and to the indicator lamp 25. The buzzer 24 is in series with the switch 77. Notches 78 in the indicator 7 cause contacts 77 to close momentarily just before each three minute period. The translucent plastic windows 71 are provided with numerals, for example, the numerals 3, 6, 9 and 12 to indicate elapsed time units. It is understood, however, that these time units as well as the total time for each revolution of the indicator 7, need not be confined to the example, but may be extended or reduced to other values without altering the intended scope of the invention While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. A telephone signal receiver comprising, pickup means physically independent of a telephone instrument and adapted for association therewith for detecting the ringing signals emanating by radiation from such instrument, means for amplifying the output of said last-named means, a relay responsive to the amplified output of said pickup means for initiating operation of said telephone signal receiver, a first and second electrical output line in said receiver, first contacts for closing said first output line, second contacts for closing said second output line, an electric motor responsive to the operation of said relay, and means operated by said motor for first closing said first contacts and for thereafter opening the same and closing said second contacts.

2. A telephone signal receiver comprising, pickup means physically independent of a telephone instrument and adapted for association therewith for detecting and recording the ringing signal emanating by radiation from such instrument, means for amplifying the output of said last-named means, means responsive to the amplified output of said pickup means for initiating operation of said telephone signal receiver, a first and second electrical output line in said receiver each having a circuit closing contact therein, means responsive to a first series of amplified outputs of said pickup means for closing and then opening said contacts in said first output line, said means being also responsive to a second series of amplified outputs of said pickup means for closing said contacts in said second output line when the contacts in said second output line are open, and means for recording said first and second series of outputs of said pick-up means.

3. A telephone signal receiver comprising, pickup means physically independent of a telephone instrument and adapted for association therewith for detecting and recording the ringing signals emanating by radiation from such instrument, means for amplifying the output of said last-named means, means responsive to the amplified output of said pickup means for initiating operation of said telephone signal receiver, a first and second electrical output line in said receiver, circuit making contacts in each of said output lines, common means responsive to a first series of amplified outputs of said pickup means for first closing said contacts in said first output line and for thereafter opening said contacts and closing said contacts in said second output line, means for recording said first and second series of outputs of said pickup means, and means for recording a time signal at the end of said output record.

4. A telephone signal receiver comprising, pickup means physically independent of a telephone instrument and adapted for association therewith for detecting and recording the ring of signals emanating by radiation from such instrument, means for amplifying the output of said last-named means, electrically responsive record tape feeding mechanism, a relay responsive to the amplified output of said pickup means for initiating operation of said electrically responsive mechanism, means responsive to said last-named mechanism adapted to establish a holding circuit therefore whereby said tape is fed continuously, a first and second electrical output line in said receiver, means responsive to a first series of amplified outputs of said pickup means for energizing said first output line, and responsive to a second series of amplified outputs of said pickup means for energizing said second output line, and means under the control of said relay for recording said series of outputs in said record tape feeding mechanism.

5. A telephone signal receiver comprising, pickup means physically independent of a telephone instrument and adapted for association therewith for detecting the ringing signal emanating by radiation from such instrument, means responsive to the output of said pickup means for initiating operation of said telephone signal receiver, first and second electrical output lines in said receiver, means responsive to a first series of outputs of said pickup means for energizing said first output line and to a second series of outputs of said pickup means for energizing said second output line, a power output circuit, manually settable time control means for closing said circuit to condition the same for operation when said time control means is set to operate for a preselected time interval, a first and a second control contact in said power output circuit, a first manually settable means in control of said first control contact for closing the same, a second manually settable means in control of said second control contact for closing the same, means responsive to the energization of said first output line for operating said first settable control means for closing said first control contact, and means responsive to the energization of said second output line for closing said second control contact, whereby said power output circuit is completed.

6. A telephone signal receiver comprising, pickup means physically independent of a telephone instrument and adapted for association therewith for detecting the ringing signal emanating by radiation from such instrument, means responsive to the output of said pickup means for initiating operation of said telephone signal receiver, first and second electrical output lines in said receiver, means responsive to a first series of outputs of said pickup means for energizing said first output line and to a second series of outputs of said pickup means for energizing said second output line, a power output circuit, manually settable time control means for closing said circuit to condition the same for operation when said time control means is set to operate for a preselected time interval, a first and a second control contact in said power output circuit, a first manually settable means in control of said first control contact for closing the same, a second manually settable means in control of said second control contact for closing the same, means responsive to the energization of said first output line for operating said first settable control means for closing said first control contact, and means responsive to the energization of said second output line for closing said second control contact, whereby said power output circuit is completed.

7. A telephone signal receiver comprising, pickup means physically independent of a telephone instrument and adapted for association therewith for detecting the ringing signal emanating by radiation from such instrument, means responsive to the output of said pickup means for initiating operation of said telephone signal receiver, first and second electrical output lines in said receiver, means responsive to a first series of outputs of said pickup means for energizing said first output line and to a second series of outputs of said pickup means for energizing said second output line, a power output circuit, manually settable time control means for closing said circuit to condition the same for operation when said time control means is set to operate for a preselected time interval, a first and a second control contact in said power output circuit, a first manually rotatable means in control of said first control contact for closing the same at a time determined by the rotational setting thereof, a second manually rotatable means in control of said second control contact for closing the same at a time determined by the rotational setting thereof, means responsive to the energization of said first output line for rotating said first settable control means for closing said first control contact, and means responsive to the energization of said second output line for rotating said second settable control means for closing said second control contact, whereby said power output circuit is completed.

8. A telephone signal receiver comprising, pickup means physically independent of a telephone instrument and adapted for association therewith for detecting the ringing signal emanating by radiation from such instrument, energizing means responsive to the output of said pickup means for initiating operation of said telephone signal receiver, first and second electrical output lines in said receiver, means responsive to a first series of outputs of said pickup means for energizing said first output line and to a second series of outputs of said pickup means for energizing said second output line, a power output circuit, manually settable time control means for closing said circuit to condition the same for operation when said time control means is set to operate for a preselected time intreval, a normally open contact in said circuit, a relay responsive to operation of said energizing means for closing said normally open contact, a first and a second control contact in said power output circuit, a first manually settable means in control of said first control contact for closing the same, a second manually settable means in control of said second control contact for closing the same, means responsive to the energization of said first output line for operating said first settable control means for closing said first control contact, and means responsive to the energization of said second output line for closing said second control contact, whereby said power output circuit is completed.

9. A telephone signal receiver comprising, pickup means physically independent of a telephone instrument and adapted for association therewith for detecting the ringing signal emanating by radiation from such instrument, means responsive to the output of said pickup means for initiating operation of said telephone signal receiver, first and second electrical output lines in said receiver, means responsive to a first series of outputs of said pickup means for energizing said first output line and to a second series of outputs of said pickup means for energizing said second output line, a pair of power output circuits having parallel contacts therein, a pair of manually settable time control means for closing said contacts in said circuits to condition the same for operation when said time control means are set to operate for preselected time intervals, normally open contact in each of said circuits, mean responsive to the operation of said signal receiver for closing said normally open contacts, a first and a second control contact in said power output circuit, a first manually settable means in control of said first control contact for closing the same, a second manually settable means in control of said second control contact for closing the same, means responsive to the energization of said first output line for operating said first settable control means for closing said first control contact, and means responsive to the energization of said second output line for closing said second control contact, whereby said power output circuit is completed.

References Cited

UNITED STATES PATENTS

| | | | |
|---|---|---|---|
| 9,802 | 6/1853 | Pope | 340—392 |
| 1,055,279 | 3/1913 | Irvin | 179—5.5 |
| 1,291,731 | 1/1919 | Bedaux | 179—5.5 |
| 1,661,249 | 3/1928 | Deakin | 58—145 |
| 1,793,761 | 2/1931 | Tilden et al. | 179—5.5 |
| 2,254,504 | 9/1941 | Von Soden | 179—5.5 |
| 2,553,084 | 5/1951 | Favre | 179—84 |

FOREIGN PATENTS

| | | |
|---|---|---|
| 126,408 | 1/1932 | Australia. |

JOHN W. CALDWELL, *Primary Examiner.*

DAVID G. REDINBAUGH, J. T. STRATMAN, *Assistant Examiners.*

UNITED STATES PATENT OFFICE
CERTIFICATE OF CORRECTION

Patent No. 3,324,245 June 6, 1967

Harold T. Stenhammar

It is hereby certified that error appears in the above numbered patent requiring correction and that the said Letters Patent should read as corrected below.

Column 8, line 32, for "new" read -- now --; column 9, line 70, for "ring of" read -- ringing --; column 10, line 2, for "therefore" read -- therefor --; column 12, line 36, for "Australia" read -- Austrian --.

Signed and sealed this 2nd day of January 1968.

(SEAL)
Attest:

Edward M. Fletcher, Jr.
Attesting Officer

EDWARD J. BRENNER
Commissioner of Patents